United States Patent [19]

McReynolds et al.

[11] Patent Number: 5,629,910
[45] Date of Patent: May 13, 1997

[54] OPTICAL DISK LIBRARY INCLUDING OPTICAL DISK MEDIA WITH NON-STANDARD THIN HUBS AND DISK DRIVE SPINDLE ADAPTOR

[75] Inventors: David P. McReynolds; Kevin J. Reardon, both of Tucson, Ariz.

[73] Assignee: International Business Machines Corporation, Armonk, N.Y.

[21] Appl. No.: 320,918

[22] Filed: Oct. 11, 1994

[51] Int. Cl.⁶ ................................................. G11B 17/22
[52] U.S. Cl. ...................................... 369/38; 369/191
[58] Field of Search .................................. 369/192, 270, 369/289, 290, 38, 36, 191; 360/99.12

[56] References Cited

U.S. PATENT DOCUMENTS 5,331,627  7/1994  Childers et al. ...................... 369/291

FOREIGN PATENT DOCUMENTS 59-112474  6/1984  Japan ...................................... 369/270
2-64960    3/1990  Japan ...................................... 369/270

*Primary Examiner*—Robert S. Tupper
*Assistant Examiner*—Kevin M. Watkins
*Attorney, Agent, or Firm*—Charles E. Rohrer

[57] ABSTRACT

Library apparatus for holding a plurality of disk cartridges wherein the library housing contains a slot for alignment with the entry slot of a disk drive. The cartridges are stacked upon an inner case within the housing and the case is driven vertically to align individual disk cartridges with the slot. A push/pull mechanism within the housing pushes the selected cartridge through the slot into the disk drive and pulls it back into the library when finished. A specially designed cartridge has a handle for interaction with the push/pull mechanism. A pseudo-spindle device is attached to the drive to enable the use of minimal-dimension cartridges in order to increase the number of disks that can be stacked within a given space in the library.

6 Claims, 3 Drawing Sheets

OPTICAL DISK LIBRARY INCLUDING OPTICAL DISK MEDIA WITH NON-STANDARD THIN HUBS AND DISK DRIVE SPINDLE ADAPTOR

This invention relates to library apparatus for use with a single disk drive and more particularly to a library which maximizes the number of optical disks contained within a given space for use with an optical disk drive.

BACKGROUND OF THE INVENTION

Optical disk devices are used for the storage of computer prepared data and have value in their ability to store large quantities of data. The media for use in such devices is reactive to the intensity modulation of light such as may be produced by the rapid switching of a semi-conductor laser. In order to write data on optical media the laser power must be controlled at a relatively high power level in order that the media can be altered in accordance with the input data stream. In reading the data back the laser power level is controlled to a lower level so that the media is not altered by the laser beam, but the reflected light indicates the presence or absence of media alterations, i.e., digits of data corresponding to the input data stream.

Writable optical media is of two general types. Media which can be written only once and media which can be written, erased and written again. Write once media is permanently altered when write power levels are produced by the laser beam. Erasable media such as magneto-optic (MO) media is not permanently altered when data is written. In the MO media the magnetic orientation of the reactive material is selectively altered in the writing process and in the erasing process the magnetic orientation is reordered.

The American National Standards Institute (ANSI) has developed cartridges with standard dimensions for holding recording media. In that manner, the manufacturers of cartridges and the manufacturers of recording/play-back apparatus (drives) have the capability of developing their respective products for use with a variety of other manufacturer's products. A standard cartridge includes datum features, for example, locating holes that are designed to mate with datum features in a drive. For example, locating pins to accurately position the cartridge within the drive. Holding features in the cartridge such as notches and recesses are dimensioned relative to the datum features. After insertion of a cartridge into a drive the notches are typically used to hold the cartridge while it is loaded onto the locating pins and simultaneously loaded onto the drive spindle.

Optical media is placed within the standard cartridge and contains a standard media hub with a centering hole for accepting the spindle of a standard disk drive. The media hub also contains magnetic material for mating with a magnet located on the spindle of the disk drive. In that manner when the cartridge is inserted into the disk drive the optical media is placed on the spindle and located properly through the centering hole while the media hub is held to the drive spindle through magnetic action. When the spindle is caused to rotate the media rotates with the spindle.

In the standard design the media hub extends significantly below the surface of the optical media so that it may mate properly with the spindle of the disk drive. The inventors herein have noted that such a design limits the number of optical media which can be located within a given space. It is therefore, an object of the invention to design a media hub which is commensurate with the thickness of the media, that is not extending significantly below or above the surface of the optical disk and preferably of a dimension which is equal to or less than the dimension of the thickness of the optical disk.

It is a further object of the invention to provide a mini-library for use with a single optical disk drive. It is a still further object to provide such a mini-library with a maximum number of optical disks located within said library.

SUMMARY OF THE INVENTION

Briefly stated, this invention is a library apparatus with a housing wherein one face of the housing is designed to mate with a standard disk drive. A slot in the housing is aligned with the entry slot in the disk drive so that disks may be entered into the drive and exited therefrom back into the library.

The housing contains an inner case which operates as an elevator to move a plurality of stacked disks located therein, such that a chosen disk can be aligned with the slot for entry into the disk drive. The housing also contains a push-pull device to move the chosen disk into the disk drive and to pull it therefrom. In that manner, the library apparatus and the disk drive operate together to provide a plurality of disks to the drive.

The invention also involves the maximizing of the number of disks within the inner case of the library by providing a disk cartridge with a media hub having a thickness commensurate with the thickness of the media itself. In that manner, the vertical height of each cartridge is minimized enabling the storage of more cartridges within the inner case.

To utilize the library with a standard disk drive the invention utilizes an attachment to adapt the spindle of the disk drive to the media hub.

The invention contemplates that a disk drive may need a special tray caddie positioned within the tray of the disk drive to accept the non-standard, slimmer disk cartridge used in the invention.

The above-mentioned and other features and objects of the invention and the manner of attaining them will become more apparent and the invention itself will be best understood by reference to the following detailed description of the invention taken in conjunction with the accompanying drawing.

BRIEF DESCRIPTION OF THE DRAWING

The invention is set forth in detail below with reference to the accompanying drawing a brief description of which follows.

DETAILED DESCRIPTION OF THE INVENTION

Figure 1:
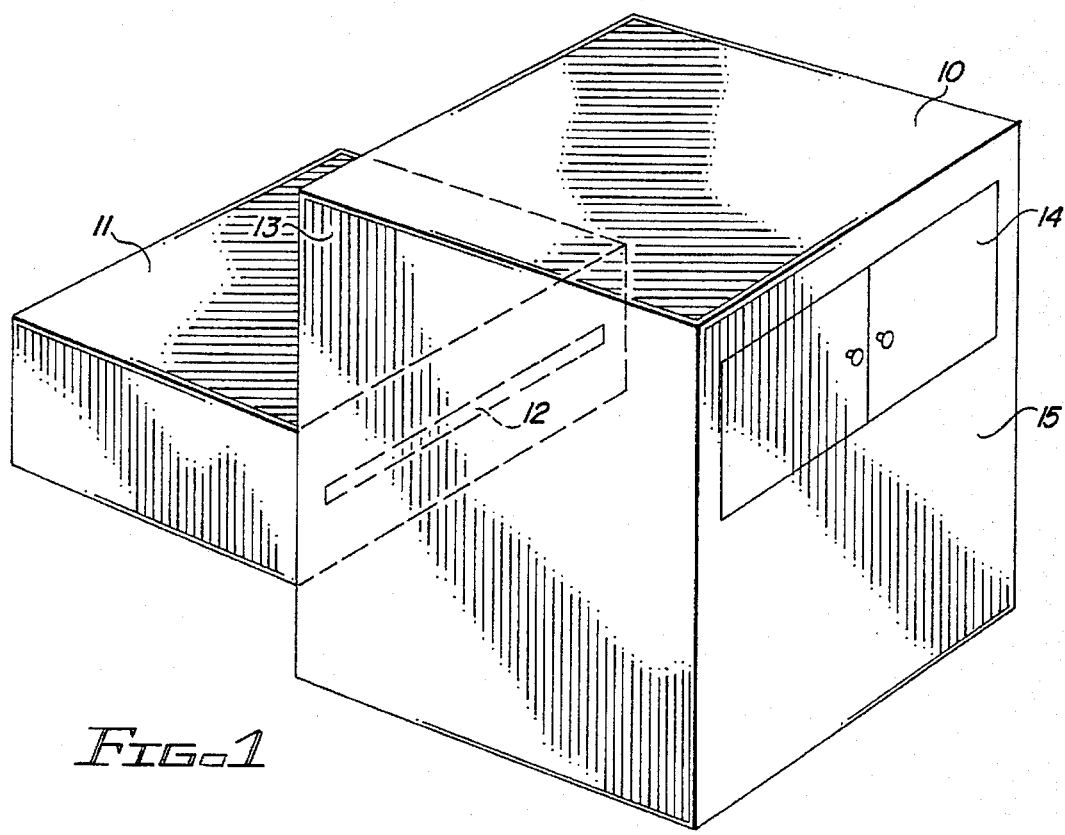
FIG. 1 is a diagrammatic perspective drawing showing the drive and the library.

When reference is made to the drawing, like numerals indicate like parts and structural features in the various figures.

FIG. 1 is a perspective view showing the library housing 10 and the disk drive 11. The front bezel of the disk drive 11 is removed so that the drive may be attached to the outer surface 13 of housing 10. A slot 12 located in the surface 13 is positioned directly adjacent the entry slot in the disk drive 11 so that disk cartridges contained within the library can be moved through slot 12 into the disk drive 11 and removed therefrom. Doors 14 are provided in the surface 15 of housing 10 so that disk cartridges may be loaded into the library.

Figure 2:
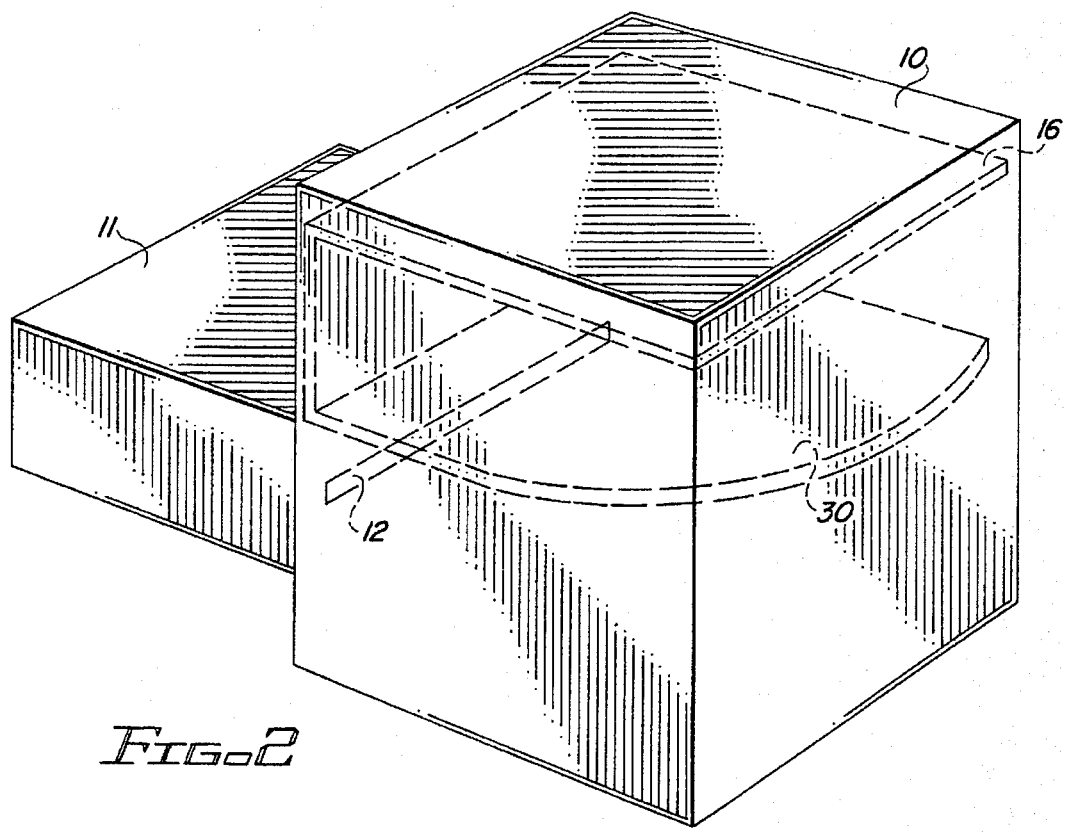
FIG. 2 is a diagrammatic perspective drawing of the library showing the inner case therein.

FIG. 2 is a view similar to FIG. 1 with doors 14 not illustrated for clarity and showing instead an inner case 16 located within the housing 10. Inner case 16 is the component of the library which holds the disk cartridges. The disk cartridges are stacked in a horizontal fashion within the inner case 16.

Figure 3:
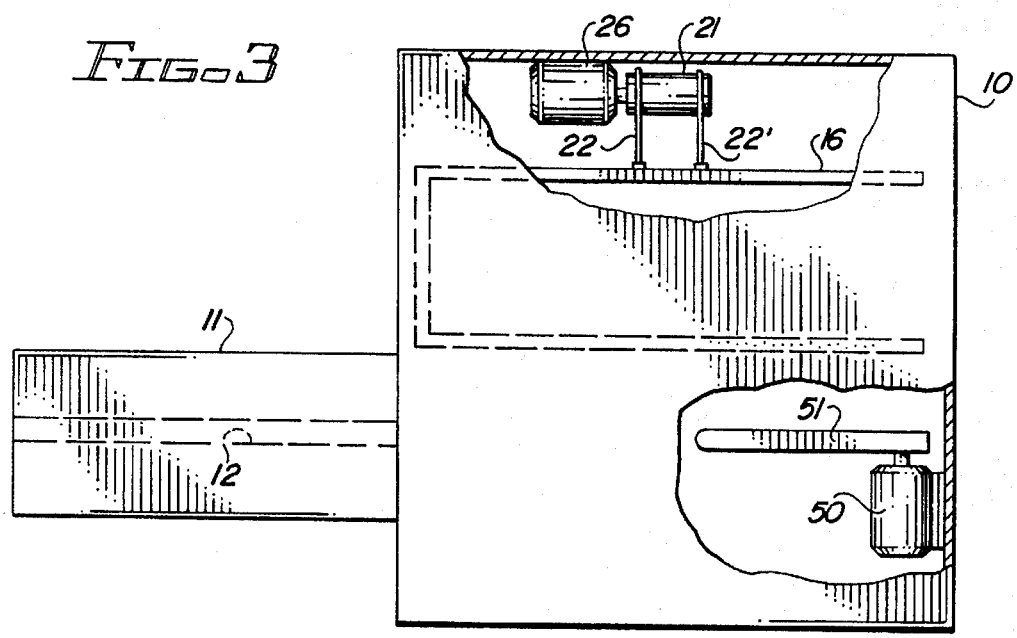
FIG. 3 is a diagrammatic side view of the library cut away showing the elevator drive system for moving the inner case within the library housing and a second drive system for delivering disk cartridges into the disk drive.

FIG. 3 is a cut-away front view of the library and disk drive combination. A first drive system is shown for moving the inner case 16 in a vertical fashion within the housing 10. A motor 26 is attached to the upper inner surface of housing 10 and rotates drum 21. Cables 22 and 22' are attached at one end to drum 21 and at the other end to the upper surface of inner case 16 such that when the drum 21 is rotated to play cables out the inner case 16 moves in a downward direction.

FIG. 3 also has a cut-away of the housing 10 to show a second drive system including motor 50 and lever arm 51. Motor 50 is mounted on the inner surface of housing 10 and is connected to rotate lever arm 51. Lever arm 51 is aligned with slot 12 in housing surface 13 and the corresponding entry slot 12' in drive 11. Rotation of lever arm 51 enables either the insertion or removal of a disk cartridge into or out of drive 11.

Figure 4:
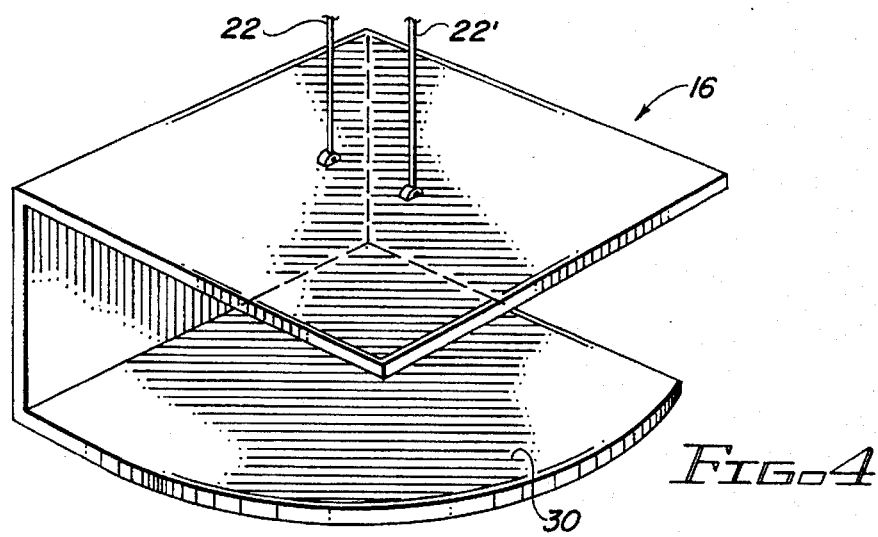
FIG. 4 is a perspective drawing of the inner case.

FIG. 4 shows a perspective view of the inner case 16 with a bottom surface 30 upon which the disk cartridges are stacked. The cartridges are preferably stacked directly one upon the other within the disk case 16. The cartridges are manually loaded by positioning the inner case 16 adjacent the doors 14 shown in FIG. 1. Note the arcuate shape of bottom surface 30 providing space for the inner case 16 to move past the second drive system mounted on housing 10 shown in FIG. 3.

Figure 5:
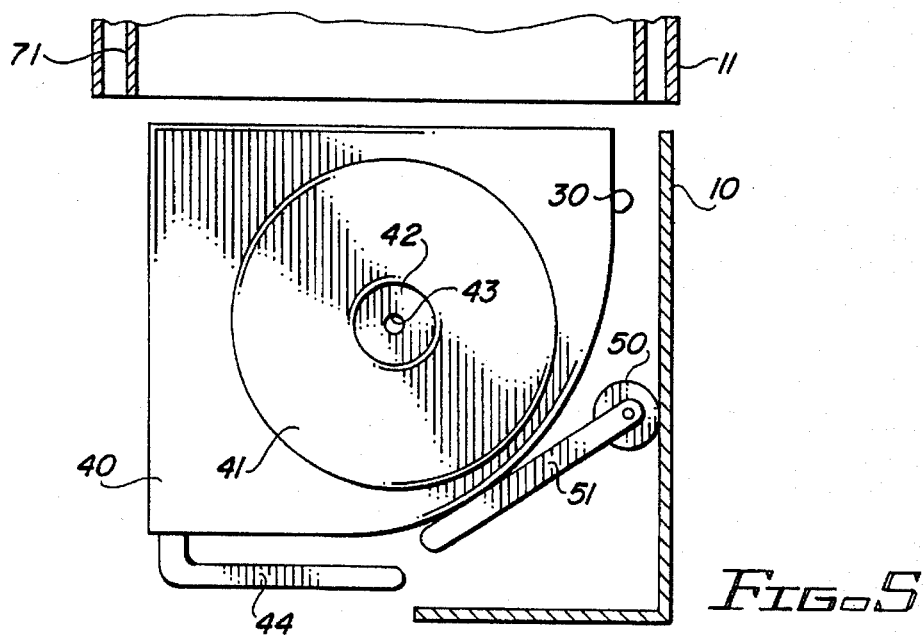
FIG. 5 shows the disk cartridge together with a drive system for pushing the cartridge into and pulling the cartridge out of the disk drive.

FIG. 5 is a top view of media stacked on the lower surface 30 of inner case 16. The disk cartridge 40 contains optical recording media 41 located on hub 42 with a centering hole 43. Note the arcuate shape of the disk cartridge is similar to that of case 16. The disk cartridge contains a handle or catch 44. FIG. 5 also illustrates the second drive system for pushing a selected cartridge out of the stack of cartridges through the slot 12 into the disk drive 11. The dimensions of slot 12 are established at slightly larger than the thickness of the disk cartridge 40 so that only one disk cartridge at a time can be pushed through the slot 12.

Figure 6:
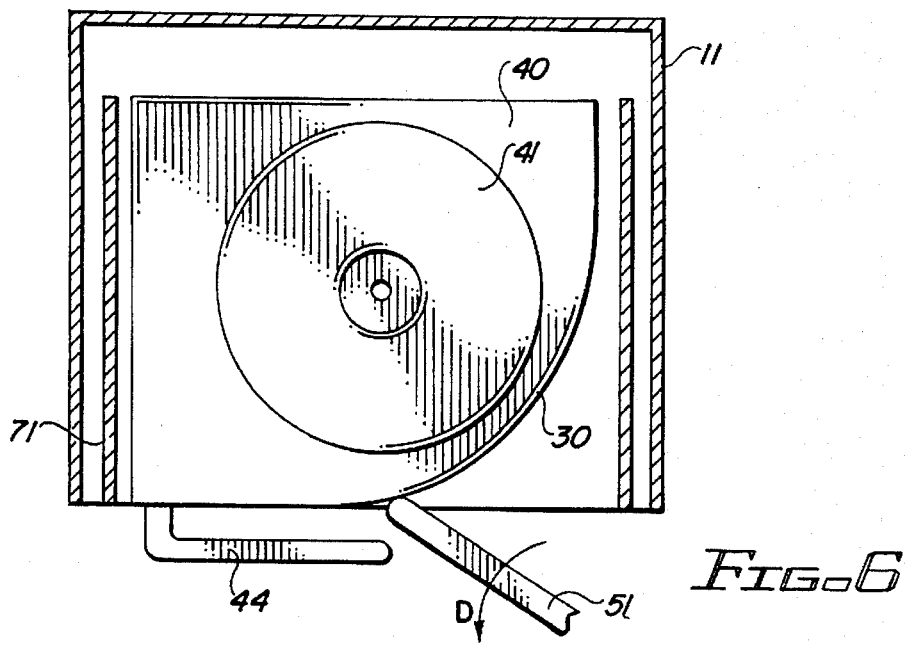
FIG. 6 is similar to FIG. 5 showing the disk cartridge in the "in" position.

FIG. 6 shows the position of disk cartridge 40 within disk drive 11 together with the relationship of push-pull lever arm 51 and cartridge handle 44. When it is desired to remove disk cartridge 40 from drive 11, arm 51 is rotated in direction D so that it bears against the handle 44 to move the disk cartridge out of disk drive 11. It should be noted that when in the position shown in FIG. 6, disk cartridge 40 may be moved in a vertical direction unobstructed by arm 51. Thus the disk drive 11 is enabled to position the disk cartridge and the media therein on the spindle for rotation of the media.

Figure 7:
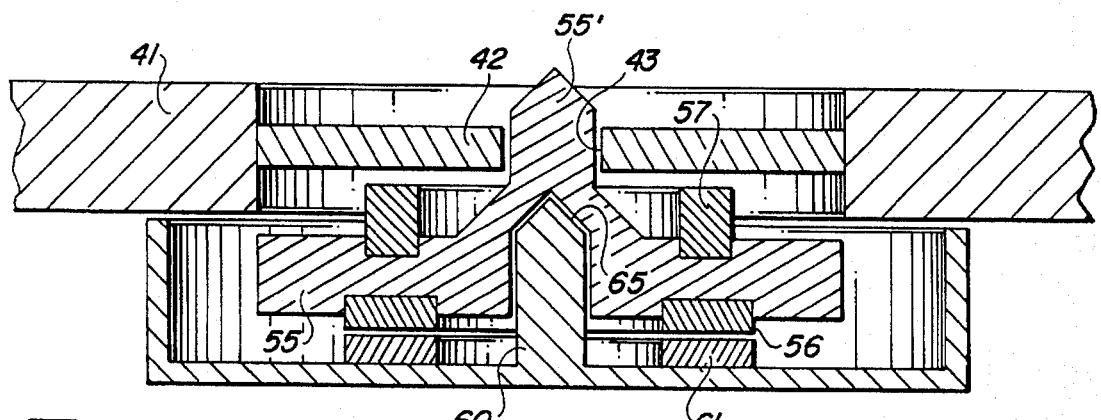
FIG. 7 shows a cross-sectional view of the media and media hub in place within the disk drive and shows the pseudo-spindle attachment to mate the spindle with the hub of the media.

FIG. 7 is a cross-sectional view of the media 41 within disk drive 11. FIG. 7 illustrates that hub 42 is of a dimension less than the thickness of the media 41. In the inventive arrangement the media hub 42 should have a thickness which is commensurate with the thickness of media 41 and by commensurate is meant a thickness that is either equal to or less than the thickness of media 41 or only slightly thicker. FIG. 7 also illustrates a pseudo-spindle device body 55 for extending the height of the drive spindle 60 so that the spindle extends through the centering hole 43 of the media hub 42. In that manner, the optical media 41 is accurately placed upon the motor spindle. Pseudo-spindle device body 55 includes a projection 55' for emulating spindle 60 and a socket 65 for accepting spindle 60. It also includes a first annular magnet 56 for magnetic interaction with annular magnet 61 located on the drive spindle. In that manner, the pseudo-spindle device body 55 is magnetically attached to the drive spindle 60. A second annular magnet 57 is also located on the pseudo-spindle device for magnetic interaction with magnetic material contained within the media hub 42. In that manner media hub 42 is magnetically attached to the pseudo-spindle 55 for rotation therewith.

Figure 8:
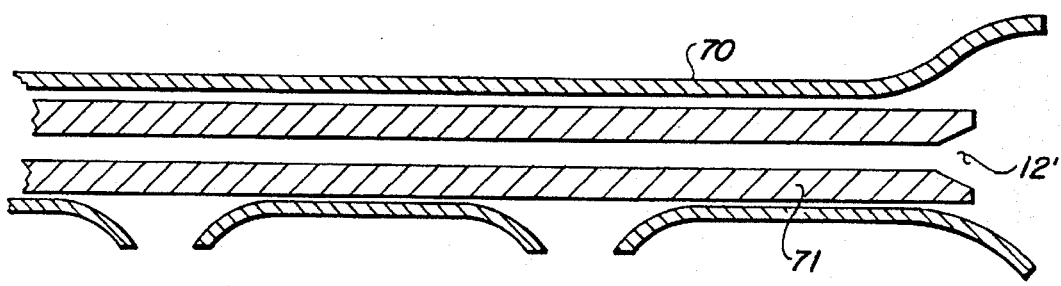
FIG. 8 shows a tray caddie within the tray of a standard disk drive.

FIG. 8 shows a side view of the tray 70 within the disk drive 11. A tray caddie 71 is positioned within the tray 70 in order to provide the right sized receptacle for the non-standard disk cartridge 40. Tray caddie 71 is also designed to emulate the external dimensions of a standard cartridge.

After loading the desired number of disk cartridges within the library, the inner case is moved by the elevator motor until the specified disk cartridge is positioned in front of the media exit slot. Positional stopping may be controlled by a light sensor triggered from a flag on each disk cartridge. The push-pull lever arm 51 is actuated to slide along the arcuate side of the cartridge as it pushes the disk cartridge into the drive. Once the disk cartridge has been moved into position in the drive, operation of the drive commences to move the media within the disk cartridge onto the spindle for rotation thereby.

While the invention has been described above with respect to a specific embodiment it will be understood by those skilled in the art that various changes in form and detail may be made therein without departing from the spirit and scope of the invention. For example, various arrangements may be designed for the first drive system to elevate the inner case. Push-pull insertion apparatus associated with the second drive system may also take various arrangements. Magnetic holding systems can be replaced by mechanical devices such as pins. Basically, this invention is to a mini-library for use with a single disk drive with the enhancement of maximizing the number of disks in the library by providing a non-standard disk cartridge design. If desired, the mini-library can be used with standard cartridges as long as the slot 12 is appropriately sized and the second drive system arrangement organized appropriately. Again, changes in form and detail do not depart from the spirit and scope of the invention which receives definition in the following claims.

What is claimed is:

1. Library apparatus for maximizing the number of optical disks stackable within library space by utilizing non-standard optical disks, said library apparatus for use with a standard disk drive apparatus which is used to read standard optical disks having a standard media portion upon which information may be resident and a standard media hub portion, said standard optical disks positioned within a standard optical disk cartridge, said library apparatus comprising said non-standard optical disks having said standard media portion and a non-standard media hub portion, said non-standard optical disks positioned within a non-standard optical disk cartridge, said library apparatus further comprising an inner case for holding a stack of said non-standard optical disk cartridges within said library space, said inner case contained within a housing, said housing having a slot adapted for alignment with an entry slot in said standard disk drive apparatus, said standard disk drive apparatus having a spindle modified by a spindle adaptor designed to mate with said non-standard optical disks, said non-standard media hub portion has a centering hole adapted for a mating relationship with the spindle adaptor, said non-standard media hub portion having a relatively thin non-standard thickness dimension commensurate with the thickness of the standard media portion thus saving space in the thickness dimension relative to the standard media hub portion, said non-standard optical disk cartridge having a slimmer thickness than said standard optical disk cartridge to take advantage of the savings in thickness dimension provided by said non-standard optical disks, thereby maximizing the number of optical disks which can be stacked upon said inner case.

2. The library apparatus of claim 1 further including a tray caddie positioned within said disk drive apparatus to provide the right-sized receptacle for the non-standard optical disk cartridge and emulate the external dimensions of said standard optical disk cartridge.

3. The library apparatus of claim 2 wherein said spindle adaptor fits upon the spindle of said disk drive to extend the height of said spindle to mate with said centering hole, said spindle adaptor further comprising:

- a first magnet adapted for magnetically mating with a magnetic material located in the spindle mechanism of said disk drive;
- a second magnet adapted for magnetically mating with magnetic material located in the non-standard media hub portion;
- a spindle body within which said first magnet and said second magnet are mounted;
- a spindle projection within said body adapted for mating with said centering hole of said non-standard media hub portion; and
- a socket within said body adapted for accepting the entry of the spindle of said disk drive;
- whereby said standard disk drive is enabled to locate and drive said non-standard media hub portion.

4. The library apparatus of claim 3 wherein said first magnet produces a stronger magnetic field than said second magnet whereby said non-standard media hub can be separated from said second magnet without dislodging said spindle adaptor from attachment with the spindle mechanism.

5. The library apparatus of claim 4 further including:

- a first drive system mounted within said housing with drive connection to said inner case;
- a second drive system mounted within said housing;
- a push/pull device driven by said second drive system, said push/pull device aligned with said slot in said housing;
- whereby optical disks located within said library apparatus are moved vertically by said first drive system until a desired disk is aligned with said slot in said housing, and whereby said desired disk can be moved out of and returned to said library apparatus through said slot by said push/pull device.

6. The library apparatus of claim 5 wherein said non-standard optical disk cartridges have an arcuate side adjacent to said push/pull device and a handle offset from said arcuate side;

whereby said push/pull device bears upon said arcuate side to move said non-standard optical disk cartridge through said slot into said disk drive apparatus and whereby said push/pull device bears upon said handle to return said non-standard disk cartridge to said library apparatus.

* * * * *

UNITED STATES PATENT AND TRADEMARK OFFICE
CERTIFICATE OF CORRECTION

PATENT NO.   : 5,629,910
DATED        : May 13, 1997
INVENTOR(S)  : McReynolds et al.

It is certified that error appears in the above-identified patent and that said Letters Patent is hereby corrected as shown below:

Title page item [56]:

References cited should include:

U.S. PATENT DOCUMENTS

| | | | |
|---|---|---|---|
| 5,136,563 | 8/92  | Takemasa et al.   | 369/36  |
| 5,101,388 | 3/92  | Fushimi           | 369/36  |
| 5,062,092 | 10/91 | Siryj et al.      | 369/38  |
| 5,050,158 | 9/92  | Kitada et al.     | 369/270 |
| 4,993,010 | 2/91  | Kishimura et al.  | 369/36  |
| 4,982,399 | 1/91  | Odawara et al.    | 369/270 |
| 4,787,074 | 11/88 | Deck et al.       | 369/36  |
| 4,561,078 | 12/85 | Nakayama          | 369/38  |
| 4,479,210 | 10/84 | Nakayama          | 369/194 |

FOREIGN PATENT DOCUMENTS

| | | |
|---|---|---|
| 2-50347 (A)    | 2/90  | Japan |
| 63-378547 (A)  | 2/88  | Japan |
| 240 237 A      | 10/87 | EPO   |

Signed and Sealed this

Twenty-third Day of December, 1997

Attest:

Attesting Officer

BRUCE LEHMAN

Commissioner of Patents and Trademarks